United States Patent
Spilman et al.

(10) Patent No.: US 9,822,280 B2
(45) Date of Patent: *Nov. 21, 2017

(54) CROSSLINKABLE COATING COMPOSITION AND METHOD OF PRODUCING THE SAME

(71) Applicant: Dow Global Technologies LLC, Midland, MI (US)

(72) Inventors: Gary E. Spilman, Midland, MI (US); Jeff R. Anderson, Midland, MI (US); John N. Argyropoulos, Midland, MI (US); Paul Foley, Traverse City, MI (US); Xinrui Yu, Midland, MI (US); John W. Hull, Midland, MI (US); Congcong Lu, Midland, MI (US); Daryoosh Beigzadeh, Midland, MI (US); Yiyong He, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/900,106

(22) PCT Filed: Jun. 18, 2014

(86) PCT No.: PCT/US2014/042883
§ 371 (c)(1),
(2) Date: Dec. 18, 2015

(87) PCT Pub. No.: WO2014/205044
PCT Pub. Date: Dec. 24, 2014

(65) Prior Publication Data
US 2016/0145466 A1 May 26, 2016

Related U.S. Application Data

(63) Continuation-in-part of application No. 13/920,343, filed on Jun. 18, 2013, now Pat. No. 9,290,675.

(51) Int. Cl.
| | | |
|---|---|---|
| C08K 5/05 | (2006.01) | |
| C08G 69/44 | (2006.01) | |
| C08G 73/10 | (2006.01) | |
| C08L 77/00 | (2006.01) | |
| C08G 63/02 | (2006.01) | |
| C09D 175/12 | (2006.01) | |
| C09D 167/00 | (2006.01) | |
| C09D 167/08 | (2006.01) | |
| C09D 161/24 | (2006.01) | |

(52) U.S. Cl.
CPC ......... *C09D 175/12* (2013.01); *C09D 161/24* (2013.01); *C09D 167/00* (2013.01); *C09D 167/08* (2013.01)

(58) Field of Classification Search
None
See application file for complete search history.

(56) References Cited

U.S. PATENT DOCUMENTS

| 2,956,964 A | 10/1960 | Christenson et al. |
|---|---|---|
| 3,387,059 A | 6/1968 | Pajot et al. |
| 3,424,724 A * | 1/1969 | Nordstrom ............. C08G 12/46 428/436 |
| 4,443,622 A | 4/1984 | Smith |
| 4,459,397 A | 7/1984 | Richardson et al. |
| 4,963,643 A | 10/1990 | Maresca et al. |
| 5,008,103 A | 4/1991 | Raleigh et al. |
| 5,189,117 A | 2/1993 | Hefner, Jr. |
| 5,795,934 A | 8/1998 | Park |
| 6,177,514 B1 | 1/2001 | Pathak et al. |
| 6,252,121 B1 | 6/2001 | Argyropoulos et al. |
| 6,444,718 B1 | 9/2002 | Blount |
| 2005/0131134 A1 | 6/2005 | Green et al. |
| 2005/0182232 A1* | 8/2005 | Ramesh ............. C08G 63/6954 528/272 |
| 2006/0234404 A1* | 10/2006 | December ................ G01N 3/42 438/14 |
| 2011/0313091 A1* | 12/2011 | Argyropoulos .... C08G 18/3831 524/391 |
| 2012/0010344 A1* | 1/2012 | Weijnen .................... C09F 9/00 524/398 |

(Continued)

FOREIGN PATENT DOCUMENTS

| DE | 10341952 | 5/2005 |
|---|---|---|
| EP | 078455 | 6/1997 |

(Continued)

OTHER PUBLICATIONS

PCT Search Report dated Sep. 24, 2014; from PCT counterpart Application No. PCT/US2014/042883.
PCT IPRP Report dated Dec. 22, 2015; from PCT counterpart Application No. PCT/US2014/042883.
Dr. Sam Mannan, P.E. CSP, "Lee's Loss Prevention in the Process Industries", vol. 1, 3rd Ed. 2005, 7 pgs.
Kenneth D.M. Harris, "Fundamental and Applied Aspects of Urea and Thiourea Inclusion Compounds", Supramolecular Chem. Jan.-Mar. 2007, vol. 19 (1-2), pp. 47-53.

(Continued)

*Primary Examiner* — Robert T Butcher

(57) ABSTRACT

The instant invention provides a crosslinkable coating composition, and method of producing the same. The crosslinkable coating composition according to the present invention comprises: (a) one or more polycarbamates derived from one or more polyesters comprising the condensation reaction product of one or more polyols with one or more polyacids, wherein said one or more polyols comprise at least 25 percent by weight of one or more units having 4 or more hydroxyl groups; (b) one or more crosslinking agents; (c) one or more acid catalysts; and (d) optionally one or more organic solvents.

4 Claims, No Drawings

(56) References Cited

U.S. PATENT DOCUMENTS

2012/0125799 A1* 5/2012 Doreau ............... C08G 18/423
                                                          206/524.3

FOREIGN PATENT DOCUMENTS

| EP | 1541639 | 6/2005 |
| EP | 2397506 | 12/2011 |
| WO | WO 0147870 | 7/2001 |
| WO | WO 03070840 | 8/2003 |
| WO | WO2010062928 | 6/2010 |

OTHER PUBLICATIONS

Barton, et al. "Chemical Reaction Hazards", Second Ed., Institute of Chemical Engineers. 1997,4 pgs.
Chinese Office Action; from Chinese counterpart Application No. 201480031949.6.

* cited by examiner

CROSSLINKABLE COATING COMPOSITION AND METHOD OF PRODUCING THE SAME

FIELD OF INVENTION

The instant invention relates to a crosslinkable coating composition, and method of producing the same.

BACKGROUND OF THE INVENTION

The use of alkyd polyols in coating compositions is generally known. However, the currently available alkyd based coating formulations suffer from certain shortcomings under ambient conditions (or low temperature bakes, e.g. 60° C. or less) such as slow hardness development, long periods of required dry time, and slow rates of curing.

Accordingly there is a need for an improved crosslinkable coating composition having improved hardness development, short dry time, and higher rates of curing under ambient conditions (or low temperature bakes, e.g. 60° C. or less). Furthermore there is need for producing such improved crosslinkable coating composition.

SUMMARY OF THE INVENTION

The instant invention provides a crosslinkable coating composition, and method of producing the same.

The instant invention provides a crosslinkable coating composition comprising: (a) one or more polycarbamates derived from one or more polyesters comprising the condensation reaction product of one or more polyols with one or more polyacids, wherein said one or more polyols comprise at least 25 percent by weight of one or more units having 4 or more hydroxyl groups; (b) one or more crosslinking agents; (c) one or more acid catalysts; and (d) optionally one or more organic solvents.

In an alternative embodiment, the instant invention further provides a process for producing a crosslinkable coating composition comprising: (a) selecting one or more polycarbamates derived from one or more polyesters comprising the condensation reaction product of one or more polyols with one or more polyacids, wherein said one or more polyols comprise at least 25 percent by weight of one or more units having 4 or more hydroxyl groups; (b) selecting one or more crosslinking agents; (c) selecting one or more acid catalysts; (d) optionally selecting one or more organic solvents; (e) contacting a, c, and d first to produce a first component; (f) contacting said first component with b; and (g) thereby producing crosslinkable coating composition.

In an alternative embodiment, the instant invention further provides a process for producing a crosslinkable coating composition comprising: (a) selecting one or more polycarbamates derived from one or more polyesters comprising the condensation reaction product of one or more polyols with one or more polyacids, wherein said one or more polyols comprise at least 25 percent by weight of one or more units having 4 or more hydroxyl groups; (b) selecting one or more crosslinking agents; (c) selecting one or more acid catalysts; (d) optionally selecting one or more organic solvents; (e) contacting a, b, and d first to produce a first component; (f) contacting said first component with c; and (g) thereby producing crosslinkable coating composition.

In another alternative embodiment, the instant invention further provides an article comprising a substrate, and at least one inventive crosslinkable coating composition associated with one surface of said substrate.

In an alternative embodiment, the instant invention provides crosslinkable coating composition, process for producing the same, articles made therefrom, and method of making such articles, in accordance with any of the preceding embodiments, except that the one or more units having 4 or more hydroxyl groups is one or more pentaerythritols.

In an alternative embodiment, the instant invention provides crosslinkable coating composition, process for producing the same, articles made therefrom, and method of making such articles, in accordance with any of the preceding embodiments, except that the condensation reaction product has at least 20 percent by weight a fatty acid component.

In an alternative embodiment, the instant invention provides crosslinkable coating composition, process for producing the same, articles made therefrom, and method of making such articles, in accordance with any of the preceding embodiments, except that the condensation reaction product has a hydroxyl number of greater than 100 mg KOH/g.

In an alternative embodiment, the instant invention provides crosslinkable coating composition, process for producing the same, articles made therefrom, and method of making such articles, in accordance with any of the preceding embodiments, except that the crosslinking agent is a polyaldehyde.

In an alternative embodiment, the instant invention provides crosslinkable coating composition, process for producing the same, articles made therefrom, and method of making such articles, in accordance with any of the preceding embodiments, except that the one or more polyacids comprise less than 75 percent by weight of one or more 1,2 phthalic acid.

In an alternative embodiment, the instant invention provides crosslinkable coating composition, process for producing the same, articles made therefrom, and method of making such articles, in accordance with any of the preceding embodiments, except that the polyester is an alkyd.

In an alternative embodiment, the instant invention provides articles, in accordance with any of the preceding embodiments, except that the substrate comprises metal, wood, polymeric materials, glass, concrete, and ceramic.

DETAILED DESCRIPTION OF THE INVENTION

The instant invention provides a crosslinkable coating composition, and method of producing the same. The crosslinkable coating composition according to the present invention comprises: (a) one or more polycarbamates derived from one or more polyesters comprising the condensation reaction product of one or more polyols with one or more polyacids, wherein said one or more polyols comprise at least 25 percent by weight of one or more units having 4 or more hydroxyl groups; (b) one or more crosslinking agents; (c) one or more acid catalysts; and (d) optionally one or more organic solvents.

According to the present invention, the ambient temperature curable crosslinkable coating composition may consist essentially of (a) one or more polycarbamates derived from one or more polyesters comprising the condensation reaction product of one or more polyols with one or more polyacids, wherein said one or more polyols comprise at least 25 percent by weight of one or more units having 4 or more hydroxyl groups; (b) one or more crosslinking agents; (c) one or more acid catalysts; and (d) optionally one or more organic solvents. In one embodiment, the crosslinkable coating compositions are substantially formaldehyde free and substantially isocyanate free. Preferably, the crosslinkable coating compositions are substantially isocyanate-free.

Polycarbamate Component Derived from Alkyd Polyol

The one or more polycarbamates are derived from one or more polyesters comprising the condensation reaction product of one or more polyols with one or more polyacids, wherein said one or more polyols comprise at least 25 percent, for example at least 30 percent, or in the alternative from 25 to 50 percent, by weight of one or more units having 4 or more hydroxyl groups. In one embodiment, the one or more polyacids comprises less than 75 percent, for example less than 50 percent, by weight by weight of one or more 1,2 phthalic acid and derivatives thereof.

The cross linking composition can comprise from 20 to 90 percent by weight of one or more polycarbamates; for example, from 25 to 75 weight percent, or in the alternative, from 30 to 70 weight percent, or in the alternative, from 35 to 60 weight percent, based on the total weight of the crosslinkable coating composition.

The one or more polycarbamates can have an average of 2 or more carbamate groups, or an average of three or more carbamate groups, or an average of four or more carbamate groups. As used herein, the term "average number of carbamate groups" means the total number average molecular weight of the polycarbamate as determined by gel permeation chromatography divided by the carbamate equivalent weight of the polycarbamate. The carbamate equivalent weight (CEW) on solids is calculated using the following equation:

CEW=[OH $EW_{polyol}$+(43×Carbamate Conversion)]÷Carbamate Conversion, where the carbamate conversion is approximated using the following equation:

Carbamate Conversion=(OH $\#_{polyol}$−OH $\#_{polycarbamate}$)÷OH $\#_{polyol}$ Preferably the polycarbamate consists essentially of, and more preferably consists of carbon, hydrogen, nitrogen, and oxygen atoms. Still more preferably the polycarbamate consists of carbon, hydrogen, nitrogen, and oxygen atoms, wherein each nitrogen and oxygen atom is the nitrogen or oxygen atom of one of the two or more carbamate groups of the polycarbamate.

Typically the polycarbamate is prepared by (a) reacting the alkyd polyol with either an unsubstituted carbamic acid alkyl ester or urea to give the polycarbamate. Examples of these reactions are illustrated graphically below in respective Schemes (a):

Scheme (a):

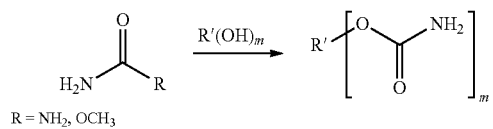

R = NH$_2$, OCH$_3$ where R'(OH)$_m$ is an alkyd polyol and m is 2 or greater.

Preferably, the polycarbamate of the present invention is substantially isocyanate free. Presence or absence of molecules containing isocyanate groups can be readily determined by Fourier Transform Infrared (FT-IR) spectroscopy or carbon-13 nuclear magnetic resonance ($^{13}$C-NMR) spectroscopy.

The polycarbamate may be made pursuant to the method disclosed in U.S. application Ser. No. 13/955,507, the disclosure of which is incorporated herein by reference. More specifically, the polycarbamate may be made by a process which comprises providing urea in liquid form; and adding the liquid urea to a polyol. In yet another embodiment, the polycarbamate is alternatively made according to a process which comprises adding solid urea to a polyol in liquid form to form a reaction mixture.

Alkyd Polyol Component

Alkyd resins are polyesters of polyhydroxyl alcohols and polycarboxylic acids chemically combined with various drying and semi-drying oils and/or their respective fatty acids in different proportions. Polyhydroxyl alcohols may include, but are not limited to, such components as ethylene glycol, diethylene glycol, neopentyl glycol, 1,4-butanediol, 1,6-hexanediol, glycerol, pentaerythritol, sorbitol and mannitol.

Suitable glycols thus include ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, dimethylolpropionic acid, and the like.

Polycarboxylic acids may include, but are not limited to, phthalic anhydride or acid, maleic anhydride or acid, fumaric acid, isophthalic acid, succinic anhydride or acid, adipic acid, azeleic acid, and sebacic acid, terephthalic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, 2,6-naphthalenedicarboxylic acid, glutaric acid, trimellitic anhydride or acid, citric acid, pyromellitic dianhydride or acid, trimesic acid, sodium sulfoisophthalic acid, as well as from anhydrides of such acids, and esters thereof, where they exist. Optionally monocarboxylic acids may be employed including, but not limited to, benzoic acid. The reaction mixture for producing alkyds includes one or more aliphatic or aromatic polycarboxylic acids, esterified polymerization products thereof, and combinations thereof. As used herein, the term "polycarboxylic acid" includes both polycarboxylic acids and anhydrides thereof. Examples of suitable polycarboxylic acids for use in the present invention include phthalic acid, isophthalic acid, terephthalic acid, tetrahydrophthalic acid, naphthalene dicarboxylic acid, and anhydrides and combinations thereof.

Drying oils may include, but are not limited to, coconut oil, fish oil, linseed oil, tung oil, castor oil, corn oil, rapeseed oil, palm oil, palm kernel oil, tallow, cottonseed oil, safflower oil, sunflower oil, soybean oil, and tall oil.

In addition to an amount of polyol reacted with a fatty acid, fatty ester, or naturally occurring-partially saponified oil, a prescribed amount of a higher functional polyol may be selected from trimethylolethane, pentaerythritol, erythritol, threitol, dipentaerythritol, sorbitol, Di-TMP, Sefose®, Quadrol® Polyol, Capa® tetrafunctional polyols, tetrafunctional phosphonate polyols, glucose, or dextrose.

Alkyds may further include any one or more modifications, for example, alkyd may be urethane modified, acrylic modified, styrene modified, vinyl ester modified, vinyl ether modified, silicone modified, epoxy modified, combinations thereof, and the like.

One or more alkyds may, for example, be one or more uralkyds, i.e. urethane modified alkyd. Uralkyds may be prepared by reacting alkyds having isocyanate-reactive groups with polyisocyanates and optionally other components having isocyanate-reactive groups. Isocyanate-reactive groups are defined as groups which will react with an isocyanate group (—NCO) and examples include —OH, —NH$_2$, —NH—, and —SH. Preferred isocyanate-reactive groups are —OH. Other components include but are not limited to polyamines and polyols, Examples of suitable polyisocyanate(s), (normally diisocyanate(s)) include aliphatic and cycloaliphatic polyisocyanates such as ethylene diisocyanate, 1,6-hexamethylene diisocyanate HDI, isophorone diisocyanate (IPDI), cyclohexane-1,4-diisocyanate, 4,4'-dicyclohexylmethane diisocyanate, cyclopentylene diisocyanate, p-tetra-methylxylene diisocyanate (p-TMXDI) and its meta isomer (m-TMXDI), hydrogenated 2,4-toluene diisocyanate and hydrogenated 2,6-toluene diisocyanate. Also araliphatic and aromatic polyisocyanates may be used, such as p-xylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate and 1,5-naphthylene diisocyanate. Particularly preferred is 2,4-toluene diisocyanate (TDI), optionally in admixture with its 2,6-isomer.

Crosslinking Agent: Polyaldehyde Component, or Acetal or Hemiacetal Thereof

The crosslinkable composition comprises a crosslinking agent, i.e. a polyaldehyde component, or acetal or hemiacetal thereof. In one embodiment, the polyaldehyde component comprises from 2 to 20 carbon atoms. In another alternative embodiment, the polyaldehyde comprises greater than 20 carbon atoms, with the proviso that a polyaldehyde having more than 20 carbon atoms has at least one aldehyde group for every 10 carbon atoms.

The crosslinkable composition may comprise from 2 to 50 percent by weight of the polyaldehyde component or acetal or hemiacetal thereof; for example, from 5 to 25 percent by weight of the polyaldehyde component or acetal or hemiacetal thereof. In one embodiment, the polyaldehyde is selected from the group consisting of (cis,trans)-1,4-cyclohexanedicarboxyaldehydes, (cis,trans)-1,3-cyclohexanedicarboxyaldehydes, pentane-1,5-dial, ethane-1,2-dial, and mixtures thereof.

For example, the polyaldehyde component can have two or more aldehyde groups. Suitable polyaldehydes of the present invention can have two, three, four or more aldehyde groups.

The polyaldehyde component can be a cyclic, straight or branched; cyclic and non-aromatic; or cyclic and aromatic.

The polyaldehyde component can comprise one or more cyclic, non-aromatic polyaldehydes or one or more aromatic polyaldehydes. For example, the polyaldehyde component can comprise one or more cyclic, non-aromatic polyaldehydes having from 3 to 20 ring carbon atoms, and may consist essentially of one or more cyclic, non-aromatic polyaldehydes having from 3 to 20 ring carbon atoms.

Each cyclic, non-aromatic polyaldehyde component can independently have from 5 to 12 ring carbon atoms, and, can be a mixture of (cis,trans)-1,4-cyclohexanedicarboxyaldehydes and (cis,trans)-1,3-cyclohexanedicarboxyaldehydes.

Examples of suitable cyclic polyaldehydes are trans-1,3-cyclohexanedicarboxaldehyde; cis-1,3-cyclohexanedicarboxaldehyde; trans-1,4-cyclohexanedicarboxaldehyde; cis-1,4-cyclohexanedicarboxaldehyde; a mixture of 1,3-cyclohexanedicarboxaldehydes and 1,4-cyclohexanedicarboxaldehydes, preferably a 1-to-1 mixture thereof; exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; endo,endo-2,6-norbornanedicarboxaldehyde product (endo and exo mixture); 3-(3-formylcyclohexyl)propanal; 3-(4-formylcyclohexyl)propanal; 2-(3-formylcyclohexyl)propanal; 2-(4-formylcyclohexyl)propanal; and cyclododecane-1,4,8-tricarbaldehyde and a mixture containing one or more of 2,8-, 3,8-, and 4,8-di(formyl)tricyclo[5.2.1.0$^{2.6}$]decane.

The trans-1,3-cyclohexanedicarboxaldehyde; cis-1,3-cyclohexanedicarboxaldehyde; trans-1,4-cyclohexanedicarboxaldehyde; and cis-1,4-cyclohexanedicarboxaldehyde can be prepared by a process comprising hydroformylating 3-cyclohexene-1-carboxaldehyde using the hydroformylating conditions described herein.

The 1:1 mixture of 1,3- and 1,4-cyclohexanedicarboxaldehydes can be prepared by a process comprising reacting acrolein and 1,3-butadiene in a Diels-Alder reaction to give 3-cyclohexenecarboxaldehyde (also called 1,2,3,6-tetrahydrobenzaldehyde), and hydroformylating the 3-cyclohexenecarboxaldehyde.

The exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; and endo,endo-2,6-norbornanedicarboxaldehyde product (endo and exo mixture) can be prepared by a process comprising reacting acrolein and cyclopentadiene in a Diels-Alder reaction to give a 2-norbornene-5-carboxaldehyde, and hydroformylating the 2-norbornene-5-carboxaldehyde.

The 3-(3-formylcyclohexyl)propanal; 3-(4-formylcyclohexyl)propanal; 2-(3-formylcyclohexyl)propanal; and 2-(4-formylcyclohexyl)propanal can be prepared by a process comprising hydroformylating vinyl cyclohexene.

The cyclododecane-1,4,8-tricarbaldehyde can be prepared by a process comprising trimerizing 1,3-butadiene to give 1,4,8-cyclododecatriene, and hydroformylating the 1,4,8-cyclododecatriene.

The mixture of 2,8-, 3,8-, and 4,8-di(formyl)tricyclo[5.2.1.0$^{2.6}$]decane can be prepared by a process comprising hydroformylating dicyclopentadiene.

The polyaldehyde component can be unblocked and unprotected or blocked or protected. Blocked or protected polyaldehydes can be formed by reacting an unblocked and unprotected polyaldehyde with a suitable blocking or protecting group. Examples of protecting or blocking groups for aldehyde groups are bisulfites (e.g., from reaction of the polyaldehyde with sodium bisulfite), dioxolanes (e.g., from reaction of the polyaldehyde with ethylene glycol), oximes (e.g., from reaction of the polyaldehyde with hydroxylamine), imines (e.g., from reaction of the polyaldehyde with methylamine), and oxazolidines (e.g., from reaction of the polyaldehyde with a 2-aminoethanol).

Preferred aldehyde protecting groups are, and preferred protected polyaldehydes comprise, a hydrated group (>C (OH)$_2$), hemiacetal, acetal, or imine. These preferred protected polyaldehydes can be prepared by respectively reacting the polyaldehyde with water; one mole equivalent of an alkanol (e.g., methanol or ethanol); two mole equivalents of the alkanol; or ammonia or a primary amine (e.g., methylamine). The hemiacetal, acetal, or imine protecting group can, if desired, be removed by a deprotection such as hydrolysis to give back the unprotected form of the polyaldehyde. Such aldehyde protecting or blocking groups and formation and removal (i.e., deprotection) is taught, for example, in U.S. Pat. No. 6,177,514 B1.

Preferably, the polyaldehyde is stable in neat form (i.e., does not materially self-polymerize) and, more preferably, is substantially water insoluble and is stable in neat form.

The polyaldehydes of the present invention can be prepared by any suitable means, including oxidation of corresponding polyols, and via batchwise and continuous processes for preparing the polyaldehydes. Preferably the polyaldehyde is prepared by hydroformylating a substantially water-insoluble mono-olefin containing aldehyde compound, substantially water-insoluble multi-olefin containing aldehyde compound, or a substantially water-insoluble multi-olefin containing starting compound (collectively referred to herein for convenience as substantially water-insoluble olefin-containing compounds). The hydroformylation step can be performed by any conventional means such as with hydrogen gas, carbon monoxide, and the olefin-containing starting compound. Preferably the hydroformylating step is performed in a manner as generally described in U.S. Pat. No. 6,252,121 B1, which describes an improved separation process.

Preparations of the polyaldehyde can optionally further comprise reversibly blocking or protecting aldehyde groups of the polyaldehydes with aldehyde blocking or protecting groups to give a blocked or protected polyaldehyde, respectively. The protected polyaldehyde can be employed in place of or in addition to the polyaldehyde component.

Preferably, the polyaldehyde component can be a mixture comprising two or more of trans-1,3-cyclohexanedicarboxaldehyde, cis-1,3-cyclohexanedicarboxaldehyde, trans-1,4-cyclohexanedicarboxaldehyde and cis-1,4-cyclohexanedicarboxaldehyde, or protected or blocked forms of these polyaldehydes.

Crosslinking Agent: Urea-Aldehyde Resin

In another embodiment, the crosslinkable coating composition comprises a crosslinking agent consisting of a urea-aldehyde resin. The urea-aldehyde resin is prepared from the reaction of urea with an aldehyde (i.e. formaldehyde, acetaldehyde, propionaldehyde, etc.) or polyaldehyde. The resulting urea-aldehyde resin can be further reacted with an alcohol (i.e. methanol, butanol, etc.) to produce an etherified urea-aldehyde resin. These resins are well known by one skilled in the art and are commercially available from several suppliers (i.e. CYMEL U-64 from Cytec Industries). The crosslinkable coating composition may comprise from 10 to 60 percent by weight of the urea-aldehyde resin; for example, from 20 to 50 percent by weight of the urea-aldehyde resin.

Acid Catalyst Component

The crosslinkable coating composition comprises 0.1 to 5 percent by weight of one or more acid catalysts; for example, from 0.5 to 3 weight percent, or from 0.5 to 2 weight percent, based on the total weight of the crosslinkable coating composition.

The acid catalyst component may be any acid catalyst suitable for promoting the reaction between the acrylic carbamate functional component and the polyaldehyde component. In one embodiment, the acid catalyst may be a Lewis acid. In another embodiment, the acid catalyst may be a protic acid. In one embodiment, the acid catalyst has a pKa of less than 6.0, or in the alternative, a pKa of less than 4.0.

The curing step of the present invention is initiated by an acid catalyst. Such initiation can be performed by exposure to heat for a period of time sufficient to produce the inventive crosslinked composition. The heat can be applied radiantly although other means such as by convection or combinations of means can be used.

Any compound, substance or material suitable for increasing a rate of reaction of a carbamate group with an aldehyde group (—C(=O)H) can be employed as the acid catalyst. Examples of acid catalysts are Lewis acids (e.g., boron trifluoride etherate) and protic acids (i.e., Brønsted acids). The acid catalyst can comprise a protic acid characterizable as having a $pK_a$ of 6 or less, wherein $pK_a$ is negative base-10 logarithm of acid dissociation constant, $K_a$, of the protic acid.

A preferred protic acid is an inorganic protic acid or organic protic acid. A preferred inorganic protic acid is phosphoric acid or sulfuric acid. A preferred organic protic acid is carboxylic acid, phosphonic acid, or sulfonic acid. A preferred carboxylic acid is acetic acid, trifluoroacetic acid, propionic acid, or a dicarboxylic acid. A preferred phosphonic acid is methylphosphonic acid. A preferred sulfonic acid is methanesulfonic acid, benzenesulfonic acid, a camphorsulfonic acid; para-toluenesulfonic acid, or dodecylbenzenesulfonic acid. Examples of suitable Lewis acid curing catalysts are $AlCl_3$; benzyltriethylammonium chloride (TEBAC); $Cu(O_3SCF_3)_2$; $(CH_3)_2BrS^+Br^-$; $FeCl_3$ (e.g., $FeCl_3 \cdot 6H_2O$); $HBF_4$; $BF_3 \cdot O(CH_2CH_3)_2$; $TiCl_4$; $SnCl_4$; $CrCl_2$; $NiCl_2$; and $Pd(OC(O)CH_3)_2$.

The acid catalyst can be unsupported (no solid support) or supported, i.e. covalently bonded to a solid support. Examples of supported acid catalysts are supported curing catalysts such as supported acid catalysts such as acid ($H^+$) forms of cation exchange-type polymer resins (e.g., ethanesulfonic acid, 2-[1-[difluoro[(1,2,2-trifluoroethenyl)oxy]methyl]-1,2,2,2-tetrafluoroethoxy]-1,1,2,2-tetrafluoro-, polymer with 1,1,2,2-tetrafluoroethene, available under the trade name NAFION NR 50 (E. I. du Pont de Nemours & Co., Inc., Wilmington, Del.) and ethenylbenzenesulfonic acid polymer with diethenylbenzene available under the trade name AMBERLYST™ 15 (Rohm and Haas Co., subsidiary of The Dow Chemical Company, Midland, Mich., USA).

Organic Solvents(s)

The cross-linkable coating composition can comprise from 0 to 90 percent by weight of one or more solvents; for example, from 20 to 70, or from 30 to 50, percent by weight of one or more solvents. Solvents may be needed for reducing the viscosity of the cross-linkable coating composition to facilitate application to a substrate. Solvents may also be required to maintain all the components of the cross-linkable coating composition in one single phase. Such solvents include, but are not limited to, organic solvents. Exemplary solvents include, but are not limited to, ethanol, ethylene glycol monoalkyl ethers, diethylene glycol monoalkyl ethers, propylene glycol monoalkyl ethers and dipropylene glycol monoalkyl ethers.

Alternative examples of suitable organic solvents are non-polar or polar organic solvents such as, for example, an alkane (e.g., a ($C_6$-$C_{12}$)alkane), aromatic hydrocarbons (e.g. toluene, xylene) ether (e.g., ($C_2$-$C_{12}$)ether, e.g., a ($C_2$-$C_{12}$) dialkyl ether), carboxylic ester (e.g., a ($C_2$-$C_{12}$)carboxylic ester), ketone (e.g., a ($C_3$-$C_{12}$)ketone), secondary or tertiary carboxamide (e.g., a secondary or tertiary ($C_3$-$C_{12}$)carboxamide), sulfoxide (e.g., a ($C_2$-$C_{12}$)sulfoxide), or a mixture of two or more thereof.

In one embodiment, water can be used as a solvent or additive, provided that the amount of water does not result in a two-phase composition.

Other Components

In one embodiment, the crosslinkable coating composition can comprise one or more curing inhibitor agents. Exemplary curing inhibitor agents include, but are not limited, to alcohols and/or water and/or mixtures thereof. Exemplary curing inhibitor agents include, but are not limited to, primary alcohols such as ethanol, n-propanol, and n-butanol.

The crosslinkable coating composition may comprise from 0 to 50 percent by weight of the one or more curing inhibitor agents; for example, from 2 to 30, or in the alternative from 10 to 20, percent by weight of the curing inhibitor agents.

In one embodiment, the cross-linkable coating composition can comprise one or more pigments. Exemplary pigments include, but are not limited to, $TiO_2$, lamp black, and talc.

In one embodiment, the cross-linkable coating composition can comprise one or more fillers. Exemplary fillers include, but are not limited to, clay, barium sulfate, and silica.

In one embodiment, the cross-linkable coating composition can comprise one or more additives. Exemplary additives include, but are not limited to, ultraviolet (UV) light stabilizers, dispersing agents, flow & leveling agents and rheology agents. Such additional additives will, of course, depend on the intended use of the coating composition. Typically useful conventional formulation additives include UV light stabilizers (hindered amines) such as Bis-(1-octyloxy-2,2,6,6-tetramethyl-4-piperidinyl) sebacate (Tinuvin 123 supplied by BASF) and 2,4-bis[N-Butyl-N-(1-cyclohexyloxy-2,2,6,6-tetramethylpiperidin-4-yl)amino]-6-(2-hydroxyethylamine)-1,3,5-triazine (Tinuvin 152 supplied by BASF); pigment and filler dispersing additives such as polyphosphoric acid polyesters (Disperbyk 110 supplied by BYK USA, Inc); and flow and leveling agents such as polyether modified polydimethylsiloxanes (BYK 333 supplied by BYK USA, Inc); and rheology modifiers such as organowaxes (Troythix XYZ supplied by Troy Corporation).

In one embodiment, the crosslinkable coating composition further comprises a metal drier. An exemplary metal drier is an iron drier such as Borchi Oxy-Coat, available from OMG Borchers.

Process for Producing the Cross-Linkable Coating Composition

The process for producing a crosslinkable coating composition, according to the present invention comprises: (a) selecting one or more polycarbamates derived from one or more polyesters comprising the condensation reaction product of one or more polyols with one or more polyacids, wherein said one or more polyols comprise at least 25 percent by weight of one or more units having 4 or more hydroxyl groups; (b) selecting one or more crosslinking agents; (c) selecting one or more acid catalysts; (d) optionally selecting one or more organic solvents; (e) contacting a, c, and d first to produce a first component; (f) contacting said first component with b; and (g) thereby producing crosslinkable coating composition.

In an alternative embodiment, the process for producing a crosslinkable coating composition, according to the present invention comprises (a) selecting one or more polycarbamates derived from one or more polyesters comprising the condensation reaction product of one or more polyols with one or more polyacids, wherein said one or more polyols comprise at least 25 percent by weight of one or more units having 4 or more hydroxyl groups; (b) selecting one or more crosslinking agents; (c) selecting one or more acid catalysts; (d) optionally selecting one or more organic solvents; (e) contacting a, b, and d first to produce a first component; (f) contacting said first component with c; and (g) thereby producing crosslinkable coating composition.

The inventive crosslinkable composition can be made in batch process via any conventional mixing device under ambient temperature and pressure.

The cross-linked coating compositions of the present invention, even those produced by curing at room temperature, have a high degree of crosslinking.

Coated Substrates

The coated substrates of the present invention comprise a coating layer derived from the inventive cross-linkable coating composition, which is in contact with at least a portion of a substrate capable of being coated.

The inventive coated substrates can be prepared by any suitable method. For example, in a method of coating a surface of a substrate, the method comprises applying the inventive cross-linkable coating composition to at least a portion of a surface of a substrate and curing at a curing temperature of 70° C. or less, or, for example, 30° C. or less, so as to prepare a coated substrate comprising a crosslinked composition.

The inventive crosslinkable coating composition can be applied to the surface of the substrate(s) by any suitable applying means such as, for example, brushing, calendaring, rolling, spraying, mopping, troweling, or dipping. The substrate being coated can be of any shape including, for example, a flat or rolled sheet (e.g., cylinder), sphere, beads, finely divided particles, and the like. The surface of the substrate being coated can be irregular or regular, continuous or discontinuous, porous or non-porous, jointed or not jointed.

The substrates suitable for being coated independently can comprise any material. Examples of suitable material are wood, metal, ceramic, plastic, composite materials, and/or glass.

The coated article comprises a coated substrate comprising a layer of the inventive cross-linked coating composition in contact with at least a portion of a substrate.

The crosslinked compositions of the present invention, even those produced by curing at room temperature, have a high degree of crosslinking. This high degree of crosslinking preferably is evidenced by their a spectral property (e.g., obtained from proton-nuclear magnetic resonance ($^1$H-NMR) spectroscopy, $^{13}$C-NMR spectroscopy, or FT-IR spectroscopy) or, more preferably, by one or more improved performance properties. Preferably at least one of the improved performance properties is cross-hatch adhesion, water resistance, deterioration resistance to methyl ethyl ketone rubs, or high pendulum hardness.

Preferably, methods of using the crosslinked compositions of the present invention comprise coatings formed with the crosslinkable compositions, wherein the coating exhibits a water resistance, resistance to rubbing with methyl ethyl ketone, high pendulum hardness, cross-hatch adhesion, or a combination of any two or more thereof.

The coating composition can also be used as an adhesive composition that is disposed between and in independent operative contact with at least a portion of two substrates.

The inventive coatings exhibit a pendulum hardness (1 day) in the range greater than 60, for example greater than 120, or from 60 to 180.

The inventive coatings exhibit a pendulum hardness (7 day) in the range greater than 80, for example greater than 120, or from 80 to 200.

The inventive coatings exhibit resistance to organic solvent, i.e., methyl ethyl ketone (MEK) back-and-forth double rubbing (i.e., one rub back, one rub forth equals one double rub) of 30 or greater, for example, 50 or greater, or in the alternative, 70 or greater, or in the alternative 100 or greater, or in the alternative from 30 to 200. Such organic solvent resistance is evidence of crosslinking to form a crosslinked composition.

The inventive coatings exhibit a cross-hatch adhesion value of from 1B to 5B, for example, from 2B to 5B, or in the alternative from 3B to 5B, or in the alternative from 4B to 5B, or in another alternative 5B.

In determining any one or more of the aforementioned pendulum hardness and number of MEK double rubs (back-and-forth), the coating is formed on a steel substrate as described herein. Furthermore, in determining cross-hatch adhesion values, the coating is formed on a wood substrate as described herein. The inventive coating had a thickness, as measured as described later, of from 10 micrometers (μm) to 70 μm, more preferably 50 μm or less, still more preferably less than 40 and even more preferably less than 30 In some embodiments the inventive coating so formed has a thickness of 14 μm or greater, and still more preferably 20 μm or greater.

The crosslinked coating compositions of the present invention can also be used as sealant compositions.

In another alternative embodiment, the instant invention further provides an article comprising a substrate, and at least one inventive crosslinkable coating composition associated with one surface of said substrate.

In an alternative embodiment, the instant invention provides crosslinkable coating composition, process for producing the same, articles made therefrom, and method of making such articles, in accordance with any of the preceding embodiments, except that the one or more units having 4 or more hydroxyl groups is one or more pentaerythritols.

In an alternative embodiment, the instant invention provides crosslinkable coating composition, process for producing the same, articles made therefrom, and method of making such articles, in accordance with any of the preceding embodiments, except that the condensation reaction product has at least 20 percent by weight a fatty acid component.

In an alternative embodiment, the instant invention provides crosslinkable coating composition, process for producing the same, articles made therefrom, and method of making such articles, in accordance with any of the preceding embodiments, except that the condensation reaction product has a hydroxyl number of greater than 100 mg KOH/g.

In an alternative embodiment, the instant invention provides crosslinkable coating composition, process for producing the same, articles made therefrom, and method of making such articles, in accordance with any of the preceding embodiments, except that the crosslinking agent is a polyaldehyde.

In an alternative embodiment, the instant invention provides articles, in accordance with any of the preceding embodiments, except that the substrate comprises metal, wood, polymeric materials, glass, concrete, and ceramic.

EXAMPLES

The following examples illustrate the present invention but are not intended to limit the scope of the invention. The following examples demonstrate that the coating compositions according to the present invention possess improved hardness development, short dry time, and higher rates of curing under ambient conditions (or low temperature bakes, e.g. 60° C.).

The alkyd polyols are first prepared by either a single or two-stage process (Step A. Alkyd Polyol synthesis), followed by the carbamylation of the alkyd polyols using a separate urea process or methyl carbamate process. Finally, the resulting polycarbamates are formulated into coatings for evaluation.

A. Alkyd Polyol Synthesis Step

I. Two-Stage Alcoholysis Procedure Starting from Triglyceride

Inventive Polyol 1 (EX-1A) was prepared according to the following 2 stage process. The recipe for the EX-1A is reported in Table 1. The calculated properties of EX-1A are reported in Table 2.

First Stage

In the first stage typical large scale alcoholysis was carried out. To a 5 L three-neck RB flask was added sunflower oil (1388.9 g). A glass stir rod and paddle were placed in the middle joint of the flask. The flask was attached to a lattice with overhead stirring, and an oil bath at room temperature was raised to submerge the flask. The setpoint on the bath was 220° C. and heating and stirring were started. To the stirred oil, PE (713.6 g) and dibutyltin catalyst (1200 ppm on total reactor charge) were added. Once all reactants were added, a packed condenser with a set point of 95° C. was attached to one of the side joints and topped with a hose adaptor that was connected to a bubbler. To the other side neck, a second hose-adaptor was attached and connected to a nitrogen inlet. A slow nitrogen sweep was placed on the system and observed in the bubbler. The reaction mixture was allowed to heat and mix overnight to ensure high conversion. This stage was completed when "monoglyceride" was achieved, where the reactor contents homogeneously dissolve (dispersed) in methanol at one part resin to three parts methanol. The example synthesis recipe is reported in Table 1.

Second Stage

The 5 L RBF containing the alcoholysis mixture was cooled to 160 C and heating and stirring were maintained. To the flask, PIA (359.0 g), PAN (538.5 g), and xylenes (2% on total charge) were added. Then, a Dean-Stark trap was connected to one of the side joints and topped with a Friedrichs condenser connected to an outlet bubbler. A nitrogen sweep was placed on the system. The system was heated to 220° C. while stirring and the water formed was distilled out as an azeotrope with xylenes. This second stage of the reaction was monitored by removing samples from the reactor and titrating the acid value (AV). The reaction was allowed to progress until the desired AV was reached. Then the reaction contents were poured into a glass jar and allowed to cool to room temperature under a pad of nitrogen.

II. Single-Stage Alkyd Polyol Synthesis Using Fatty Acid

Inventive Polyols 2-4 (EX-2A, EX-3A, and EX-4A, respectively) were prepared according to the following single stage process. The recipes for the EX-2A, EX-3A, and EX-4A are reported in Table 1. The calculated properties of EX-2A, EX-3A, and EX-4A are reported in Table 2.

This synthesis method followed a single-stage fatty acid cook procedure, using the same apparatus as described above for a 2-stage process. The recipe ingredients are listed in the table by percentage, and were scaled to a 3000 g initial charge. In this setup, the fatty acid was charged initially with all the other recipe ingredients. The reactor was then closed, purged under nitrogen atmosphere, stirred, and heated by mantle to 220° C. The process was done solventless. Condensation waters were removed overhead using a short-path condenser with a receiver. Progress of the reaction was monitored by measuring acid value of the resin by titration. Samples were later measured for mol wt profile by GPC.

TABLE 1

| Alkyd Name | EX-1A % Medium sun oil | EX-2A % Medium oleic-lauric | EX-3A % Long TOFA | EX-4A % Short stearic |
|---|---|---|---|---|
| Trimethylolethane (TME) | — | 10.504 | — | 19.431 |
| Pentaerythritol (PE) | 23.785 | 19.118 | — | 12.945 |
| Dipentaerythritol (DPE) | — | — | 27.217 | — |
| Sunflower oil (Sun) | 46.298 | — | — | — |
| Phthalic anhydride (PAN) | 17.951 | — | 12.642 | — |
| Isophthalic acid (PIA) | 11.967 | 24.160 | — | 35.330 |
| Oleic Acid (OA) | — | 23.109 | — | — |
| Lauric Acid (LA) | — | 23.109 | — | — |
| Stearic Acid (SA) | — | — | — | 32.294 |
| Tall Oil Fatty Acid (TOFA) | — | — | 60.141 | — |

TABLE 2

|  | EX-1A | EX-2A | EX-3A | EX-4A |
|---|---|---|---|---|
| Calculated oil content (%) | 49 | 53 | 66 | 37 |
| Target AV final (mg KOH/g) | 8.0 | 5.0 | 9.0 | 6.0 |
| Calculated OH value (mg KOH/g) | 180 | 190 | 149 | 182 |

B. Carbamylation Conversion of Alkyd Polyols

All reactions were carried out in a 2000 ml round bottom reactor system equipped with a mechanical stirrer, reflux condenser, nitrogen gas purge system and temperature control. A heating mantle was used for temperature control in all setups.

I. Conversion in Aqueous Urea (Making Polycarbamate)

Inventive polycarbamates 1 and 2 (EX-1C and EX-2C, respectively) were prepared via aqueous urea process (also known as liquid urea route) using inventive polyols 1 and 2 (EX-1A and EX-2A, respectively) according to the following process. The reactor was charged with the hydroxyl functional polyol (2000 g), diluted to a final solids level of 60-70% in xylene to achieve a process viscosity which allowed efficient stirring at 140° C. The catalyst, Fascat 4201 dibutyl tin oxide (DBTO, Arkema, Inc.), was added to the alkyd polyol in the reactor at 0.6% on solids. The urea (Sigma-Aldrich, 99.5%) amount used was calculated based on the hydroxyl value for the alkyd polyol, and indexed at 62% of full conversion. For an alkyd polyol with a hydroxyl value of 182 mg KOH/g (EX-1A), 119.4 mg urea per g of alkyd polyol was used. For the 2000 g batch of alkyd polyol, 238.7 g total of urea was first dissolved in distilled water to make a 50 wt % aqueous solution. The alkyd-solvent-catalyst mixture in the reactor was slowly heated to 140° C. and nitrogen purged for at least 30 min. Urea solution was loaded into 60 ml glass syringes and was carefully fed into the reactor at a constant controlled rate through a syringe pump. The urea solution was steadily fed into the reactor over 6-10 hrs. Azeotropic vapor was formed and cooled in the condenser, which was then collected in the Dean-Stark trap. The reaction was carefully maintained at 140° C., mixing at 500-600 rpm, nitrogen purge at 20 sccm, and continued for 10-12 hr until completion. Samples were taken periodically for NMR and GPC analysis. The theoretical conversion from hydroxyl to carbamate was calculated, and reported in Table 3.

II. Conversion Using Methyl Carbamate to Make Polycarbamate

Inventive polycarbamates 3 and 4 (EX-3C and EX-4C, respectively) were prepared via methylcarbamate process using inventive polyols 3 and 4 (EX-3A and EX-4A, respectively) according to the following process. In this process, transcarbamation was carried out using methyl carbamate (Sigma Aldrich, 99%) to convert the alkyd polyol to alkyd carbamate. The hydroxyl functional alkyd polyol was weighed into the reactor (2000 g), diluted to 60-70% solids with xylene solvent to allow efficient mixing at 140° C., and charged with Fascat 4201 (DBTO, Arkema, Inc.) at 1000 ppm on solids. The methyl carbamate amount used was calculated based on the hydroxyl value for the alkyd polyol, and indexed at 100% full conversion. For an alkyd polyol with a hydroxyl value of 182 mg KOH/g (EX-4), 243.3 mg methyl carbamate per g of alkyd polyol was used. For the 2000 g batch of alkyd polyol, 486.6 g total methyl carbamate was then added directly to the reactor. The reactor contents were then purged with nitrogen atmosphere during the initial heating, and maintained under nitrogen atmosphere for the duration of the reaction. The byproduct, methanol, was condensed along with xylene solvent overhead through the condenser and collected in a receiver. Once the reactor contents reached 140° C. as measured by internal thermocouple, the temperature was maintained overnight for 16 hours. At the completion of this time, the nitrogen flux was turned up to enhance the removal of any residual methyl carbamate under stirring, along with a reduction in the solvent content. After 2 hours of high flow nitrogen gas purge through the resin, the material was diluted back with xylene to 70% solids, and poured into a glass container. The theoretical conversion from hydroxyl to carbamate was calculated, and reported in Table 3.

TABLE 3

| Carbamylated Polyol | EX-1C | EX-2C | EX-3C | EX-4C |
|---|---|---|---|---|
| Carbamylation method | Urea | Urea | Me Carb | Me Carb |
| Conversion calculation by OHN (%) | 66 | 63 | 47 | 57 |

Inventive Coating Formulations 1-5

Inventive Coating Formulations 1-5 (EX-1F$_1$; EX-1F$_{11}$; EX-2F, EX-3F, and EX-4F, respectively) were prepared according to the recopies provided in Table 4 according to the following process.

All formulation components listed in Table 4 with the exception of the acid catalyst were placed in an appropriate size screw-top-lid container and mixed using a Flacktek DC 150 SpeedMixer™ for three minutes at 3,000 RPM at ambient conditions to form a homogenous pre-formulation mixture. The acid catalyst was then added to the homogenous formulations mixture as the final component and either stirred in by hand or mixed with the SpeedMixer™ for 30 seconds at 1,000 RPM.

Each EX-1F$_i$; EX-1F$_{ii}$; EX-2F, EX-3F, and EX-4F was applied over an aluminum panel and allowed to cure under ambient conditions to form a coatings of approximately between 1 to 2 mils. Coating properties of EX-1F$_i$; EX-1F$_{ii}$; EX-2F, EX-3F, and EX-4F were measured and are reported in Table 5.

TABLE 4

| Formulation Components | EX-1F$_i$ | EX-1F$_{ii}$ | EX-2F | EX-3F | EX-4F |
|---|---|---|---|---|---|
| EX-1C (W %) | 35.7 | 36.4 | — | — | — |
| EX-2C (W %) | — | — | 37.0 | — | — |
| EX- 3C (W %) | — | — | — | 54.8 | — |
| EX-4C (W %) | — | — | — | — | 35.3 |
| Xylenes (W %) | 15.3 | 15.6 | 12.4 | — | 8.0 |
| Mineral spirits (W %) | — | — | 0.9 | — | 0.5 |
| Methyl ethyl ketone (W %) | 25.4 | 25.9 | — | — | — |
| Ethanol (W %) | 12.8 | 13.0 | 28.0 | 19.3 | 26.5 |
| Borchi Oxy-Coat (W %) | 1.8 | — | — | — | — |
| n-butyl acetate (W %) | — | — | 11.8 | 12.2 | 20.5 |
| Butyl cellosolve (W %) | — | — | — | 5.7 | — |
| CHDA (W %) | 7.7 | 7.8 | 8.8 | 7.2 | 8.3 |
| p-TSA (40% in IPA) (W %) (Acid Catalyst) | 1.3 | 1.3 | 1.1 | 0.8 | 0.9 |

TABLE 5

| | EX-1F$_i$ | EX-1F$_{ii}$ | EX-2F | EX-3F | EX-4F |
|---|---|---|---|---|---|
| MEK double rubs (24 hour ambient cure) | 146 | 46 | 41 | — | — |
| MEK double rubs (7 day ambient cure) | 225 | 320 | 190 | 400 | 150 |
| Pendulum hardness (24 hour ambient cure) | 136 | 154 | 184 | 71 | 133 |
| Pendulum hardness (7 day ambient cure) | 132 | 149 | 190 | 90 | 150 |
| Dry Time (minutes) | 13 | 9 | 19 | 14 | 21 |

TEST METHODS

Test methods include the following:
OH Number Titration

Where OH # is the magnitude of the hydroxyl number for a polyol as expressed in terms of milligrams potassium hydroxide per gram or polyol (mg KOH/g polyol). Hydroxyl number (OH #) indicates the concentration of hydroxyl moieties in a composition of polymers, particularly polyols. The hydroxyl number for a sample of polymers is determined by first titrating for the acid groups to obtain an acid number (mg KOH/g polyol) and secondly, acetylation with pyridine and acetic anhydride in which the result is obtained as a difference between two titrations with potassium hydroxide solution, one titration with a blank for reference and one titration with the sample. A hydroxyl number is the weight of potassium hydroxide in milligrams that will neutralize the acetic anhydride capable of combining by acetylation with one gram of a polyol plus the acid number from the acid titration in terms of the weight of potassium hydroxide in milligrams that will neutralize the acid groups in the polyol. A higher hydroxyl number indicates a higher concentration of hydroxyl moieties within a composition. A description of how to determine a hydroxyl number for a composition is well-known in the art, for example in Woods, G., The ICI Polyurethanes Book, 2$^{nd}$ ed. (ICI Polyurethanes, Netherlands, 1990).

Hydroxyl equivalent weight (OH EW) is calculated using the following formula

OH EW=56100/OH #

Percent Solids (Polycarbamate or Polyol)

Approximately 0.5 g of polymer is weighed into an aluminum weighing dish. Approximately 1 ml of toluene is added to the aluminum weighing dish. Duplicate weighing dishes are prepared and placed in a 105° C. oven for greater than 4 hours. The percent solids are calculated using the following formula:

% Solids=100×(final sample weight/initial sample weight)

The percent solids are an average of the duplicate samples.

Pendulum Hardness

Pendulum hardness testing is performed according to ASTM D4366 method, and average of 3 measurements are averaged and reported.

MEK Double Rubs

Methyl ethyl ketone (MEK) resistance after both one and seven days in ambient cure was measured according to ASTM D5402. Solvent resistance and degree of crosslinking is evaluated by using a semi-automated MEK rub test machine (DJH Designs Inc.). The coated substrates were rubbed with a cloth soaked in methyl ethyl ketone (MEK) that is attached to the rubbing block. Each back and forth rub counts as one double rub. This machine applies constant downward pressure (80 psi), constant speed (70 double rubs/min) and counts the number of double strokes applied.

Dry Time

Dry time was tested according to according to ASTM-D 5895.

The present invention may be embodied in other forms without departing from the spirit and the essential attributes thereof, and, accordingly, reference should be made to the appended claims, rather than to the foregoing specification, as indicating the scope of the invention.

We claim:

1. A crosslinkable coating composition comprising:
  a. one or more polycarbamates derived from one or more polyesters comprising the condensation reaction product of one or more polyols with one or more polyacids, wherein said one or more polyols comprise at least 25 percent by weight of one or more units having 4 or more hydroxyl groups and wherein said one or more polyacids comprise less than 75 percent by weight of one or more 1,2-phthalic acid and derivatives thereof and wherein the condensation reaction product has (i) at least 20 percent by weight of a fatty acid component, and (ii) a hydroxyl number of greater than 100 mg KOH/g, and wherein said one or more polycarbamates are substantially isocyanate free and wherein the polycarbamate is produced by a process which comprises (A) providing urea in liquid form and adding the liquid urea to a polyol, wherein the liquid form is selected from the group consisting of in solution, a melt and a clathrate or (B) adding solid urea to a polyol in liquid form to form a reaction mixture;
  b. one or more crosslinking agents, wherein said one or more crosslinking agents are polyaldehydes;
  c. one or more acid catalysts; and
  d. optionally one or more organic solvents;
wherein said crosslinkable coating composition has methyl ethyl ketone back-and-forth double rubbing measured after 24 hr of ambient cure of 30 or greater, and a pendulum hardness measured after 24 hour of ambient cure in the range of greater than 60.

2. The crosslinkable coating composition of claim 1, wherein the one or more units having 4 or more hydroxyl groups is selected from the group consisting of pentaerythritol and dipentaerythritol.

3. The crosslinkable coating composition of claim 1, wherein said crosslinkable coating composition further comprises a metal drier.

4. The crosslinkable coating composition of claim 3, wherein said metal drier is an iron dryer.

* * * * *